United States Patent
Tokunaga

(10) Patent No.: US 10,248,066 B2
(45) Date of Patent: Apr. 2, 2019

(54) IMAGE FORMING SYSTEM, IMAGE FORMING APPARATUS, AND AUTHENTICATION SERVER

(71) Applicant: KYOCERA Document Solutions Inc., Osaka (JP)

(72) Inventor: Tomoharu Tokunaga, Osaka (JP)

(73) Assignee: Kyocera Document Solutions, Inc. (JP)

( * ) Notice: Subject to any disclaimer, the term of this patent is extended or adjusted under 35 U.S.C. 154(b) by 171 days.

(21) Appl. No.: 15/115,656

(22) PCT Filed: Jan. 27, 2015

(86) PCT No.: PCT/JP2015/052233
§ 371 (c)(1),
(2) Date: Jul. 29, 2016

(87) PCT Pub. No.: WO2015/122274
PCT Pub. Date: Aug. 20, 2015

(65) Prior Publication Data
US 2017/0176910 A1    Jun. 22, 2017

(30) Foreign Application Priority Data
Feb. 12, 2014 (JP) .................................. 2014-024240

(51) Int. Cl.
*G06F 3/12* (2006.01)
*G03G 15/00* (2006.01)
(Continued)

(52) U.S. Cl.
CPC ..... *G03G 15/5091* (2013.01); *G03G 15/5066* (2013.01); *G03G 15/5087* (2013.01);
(Continued)

(58) Field of Classification Search
USPC ....................................................... 358/1.15
See application file for complete search history.

(56) References Cited

U.S. PATENT DOCUMENTS

2009/0284785 A1*  11/2009  Bando ................... G06F 21/608
                                                    358/1.15
2010/0208298 A1*  8/2010  Kitagata ................ G06F 3/1207
                                                    358/1.15

FOREIGN PATENT DOCUMENTS

JP    2007-237472    9/2007
JP    2009274242    11/2009
(Continued)

*Primary Examiner* — Neil R McLean
*Assistant Examiner* — Darryl V Dottin

(57) ABSTRACT

When a first image forming apparatus 1 cannot perform printing based on a print instruction from a user, the first image forming apparatus 1 (a1) makes a substitution printing request to a second image forming apparatus 2 and (a2) receives a temporary authentication ID from this second image forming apparatus 2 and notifies the user of it if the user is not managed by an authentication server 4 that manages this second image forming apparatus 2. If the user is not managed by the authentication server 4 and not authenticated when receiving the substitution printing request, the second image forming apparatus 2 (b1) requests the authentication server 4 to issue the authentication ID, (b2) receives the authentication ID and notifies the apparatus 1 of it, and (b3) receives a user inputted authentication ID and performs the printing if the inputted authentication ID is identical to the received one.

4 Claims, 4 Drawing Sheets

(51) Int. Cl.
*G06F 21/31* (2013.01)
*G06F 21/60* (2013.01)
*H04L 29/06* (2006.01)

(52) U.S. Cl.
CPC ............ *G06F 3/121* (2013.01); *G06F 3/1222* (2013.01); *G06F 3/1234* (2013.01); *G06F 3/1238* (2013.01); *G06F 3/1261* (2013.01); *G06F 3/1285* (2013.01); *G06F 3/1291* (2013.01); *G06F 21/31* (2013.01); *G06F 21/608* (2013.01); *H04L 63/0876* (2013.01); *G03G 2215/00113* (2013.01)

(56) References Cited

FOREIGN PATENT DOCUMENTS

| | | |
|---|---|---|
| JP | 2010109721 | 5/2010 |
| JP | 2013-055470 | 3/2013 |

* cited by examiner

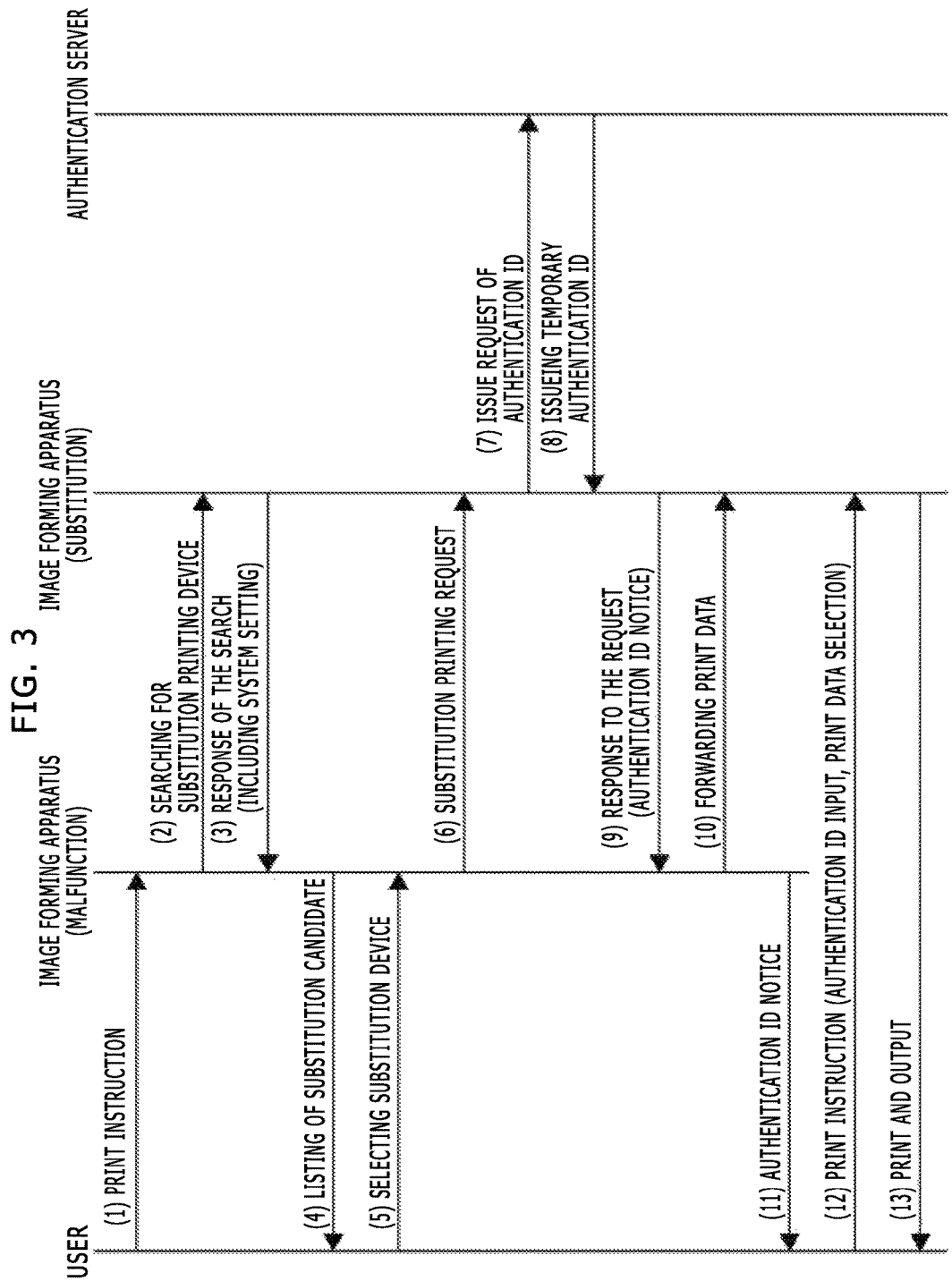

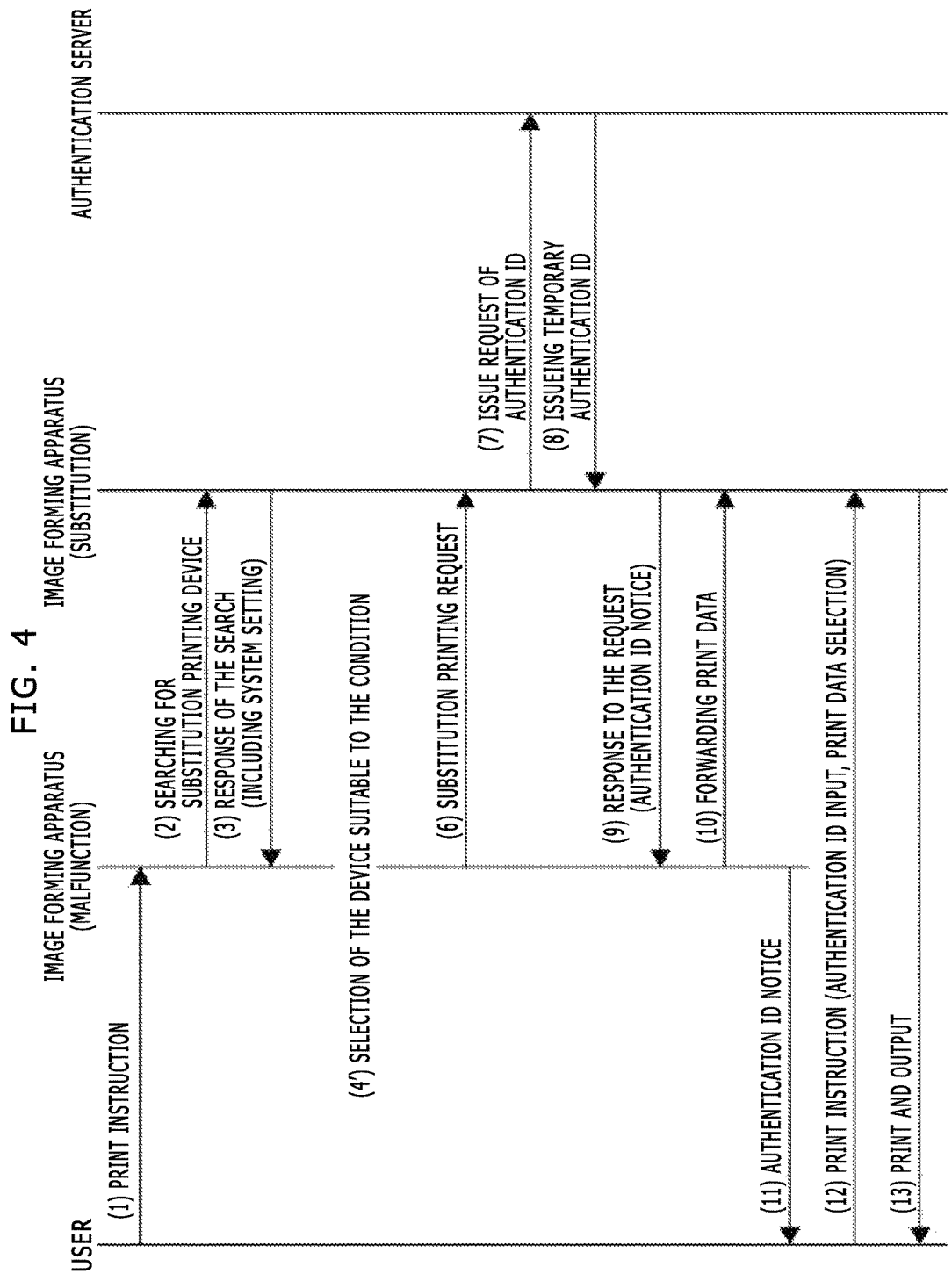

IMAGE FORMING SYSTEM, IMAGE FORMING APPARATUS, AND AUTHENTICATION SERVER

TECHNICAL FIELD

The present invention relates to an image forming system, an image forming apparatus, and an authentication server.

BACKGROUND ART

When a user performs printing using an image forming apparatus, an image forming apparatus requested of the printing sometimes can not perform the printing due to a mechanical malfunction, toner empty, paper jam or the like. In such cases, the user can request the printing to another image forming apparatus, and the image forming apparatus requested of the printing at first can request another image forming apparatus as a substitution of the printing.

For example, an image forming apparatus disclosed in PATENT LITERATURE #1 includes a detachable and attachable operation panel in order to perform substitution printing. When a user requests this image forming apparatus of the printing and can not perform the printing in this image forming apparatus due to some malfunction, the user detaches the operation panel from this image forming apparatus, and walks around to seek an image forming apparatus that can perform substitution printing with the operation panel.

Using wireless communication, this operation panel searches for an image forming apparatus that performs substitution printing. The operation panel keeps print data, a printing condition and the like in the operation panel, and displays a candidate of an image forming apparatus suitable to the substitution printing on the operation panel. Among the displayed candidates, a user selects an image forming apparatus that the user causes to perform the substitution printing, and the user attaches the operation panel to the selected image forming apparatus. The image forming apparatus to which the operation panel is attached performs the substitution printing.

Further, the technique disclosed in PATENT LITERATURE #1 displays a difference between a function of the image forming apparatus requested by a user of the printing at first and a function of an image forming apparatus for the substitution printing and thereby makes it easy to select an image forming apparatus that a user causes to perform the substitution printing. Here the difference of the functions is, for example, that an image forming apparatus has a finisher function such as punching and stapling but another image forming apparatus does not have it.

Furthermore, when a trouble occurs in an image forming apparatus, the technique disclosed in PATENT LITERATURE #2 uses a substitution image forming apparatus for printing maintenance information for fixing the trouble. In this technique, some substitution image forming apparatuses are registered in advance with priority levels; and when the image forming apparatus in which a trouble occurs can not print the maintenance information, it is tried to print the maintenance information using the substitution image forming apparatus selected in the order of the priority levels. The image forming apparatus in which a trouble occurs and the substitution image forming apparatus performs communication via a network with each other and thereby performs such process.

Meanwhile, recently, in order to properly carry out information management, image forming apparatuses are getting to have a user authentication function for a higher security level of information printed in image forming apparatuses. In user authentication in an image forming apparatus, an administrator registers in advance a user in an authentication server that connects to a network, and the user can use the image forming apparatus by using an authentication ID issued by the authentication server.

The authentication server is sometimes configured as an independent computer or sometimes configured to be built in an image forming apparatus as an image forming apparatus that has a user authentication function.

This authentication function prevents improper use of the image forming apparatus and leakage of printed information.

CITATION LIST

Patent Literature

PATENT LITERATURE #1: JAPANESE PATENT APPLICATION PUBLICATION No. 2013-55470, and PATENT LITERATURE #2: JAPANESE PATENT APPLICATION PUBLICATION No. 2007-237472.

SUMMARY OF INVENTION

Technical Problem

In the technique described in PATENT LITERATURE #1, for realizing the substitution printing, it is required to manufacture the operation panel that is hardware having the special function.

Further, when it is tried to perform the substitution printing based on the technique described in PATENT LITERATURE #2 in a network environment with the valid user authentication function, if a user of the image forming apparatus in which a trouble occurs is not registered in the authentication server, then such user can not immediately perform the substitution printing.

For enabling a user to perform the substitution printing, it is required to register such user in the authentication server that manages an image forming apparatus that performs the substitution printing; and if users are registered in a systematic manner corresponding to users' organization or the like in the authentication server, registering such user results in a management problem that disturbs such management system in the authentication server.

More specifically, in general, in the authentication server for an image forming apparatus used by employees who belong to a business department, only the employees who belong to the business department are registered as users of the image forming apparatus, but there is a situation that an employee of a personnel department must be registered exceptionally.

In addition, it is required to register such user every time when the substitution printing should be performed, and consequently it is bothersome.

In the view of the aforementioned situation, an objective of this invention is to provide an image forming system capable of substitution printing without disturbing the management system in the authentication server, and an image forming apparatus and an authentication server included in such image forming system.

Solution to Problem

An image forming system according to an aspect of the present invention includes a first image forming apparatus, at least one second image forming apparatus, and an authentication server that performs user authentication of the at least one second image forming apparatus. The first image forming apparatus, the second image forming apparatus and the authentication server are capable of connecting to each other using a network. The first image forming apparatus comprises a first control unit configured to (a1) make a substitution printing request to the second image forming apparatus available to perform printing based on a print instruction from a user and (a2) receive an authentication ID from the requested second image forming apparatus if the user is not managed by the authentication server that manages the requested second image forming apparatus and notify the user of the received authentication ID, when the first image forming apparatus can not perform the printing based on the print instruction, the authentication ID issued for temporary authentication of the user. The second image forming apparatus comprises a second control unit configured to (b1) request the authentication server to issue the authentication ID, (b2) receive the issued authentication ID and notify the first image forming apparatus of the received authentication ID, and (b3) receive inputting the authentication ID from the user and perform printing based on the print instruction if the inputted authentication ID is identical to the received authentication ID; if the authentication server can not authenticate the user who is not managed by the authentication server when the second image forming apparatus receives the substitution printing request from the first image forming apparatus. The authentication server comprises a third control unit configured to issue the authentication ID when receiving a request to issue the authentication ID from the second image forming apparatus.

Further, an image forming apparatus according to an aspect of the present invention includes a control unit configured to (a1) make a substitution printing request to another image forming apparatus connected via a network and available to perform printing based on a print instruction from a user and (a2) receive an authentication ID from the requested another image forming apparatus if the user is not managed by the authentication server that manages the requested another image forming apparatus and notify the user of the received authentication ID, when this image forming apparatus can not perform the printing based on the print instruction. The authentication ID is issued for temporary authentication of the user.

Furthermore, an image forming apparatus according to an aspect of the present invention includes a control unit configured to receive via a network a substitution printing request from another image forming apparatus that can not perform printing based on a print instruction from a user; and if the authentication server can not authenticate the user who is not managed by the authentication server, (a) request an authentication server to issue an authentication ID, (b) receive the issued authentication ID and notify the another image forming apparatus of the received authentication ID, and (c) receive inputting the authentication ID from the user and perform printing based on the print instruction if the inputted authentication ID is identical to the received authentication ID. The authentication ID is issued for temporary authentication of the user.

Furthermore, an authentication server according to an aspect of the present invention includes a control unit configured to receive a request to issue an authentication ID via a network from an image forming apparatus managed by this authentication server and issue the authentication ID. The authentication ID is issued for temporary authentication of a user who is not managed by this authentication server.

Advantageous Effects of Invention

As mentioned, the present invention enables to perform substitution printing without disturbing a management system in an authentication server.

BRIEF DESCRIPTION OF DRAWINGS

FIG. 3 shows a sequence chart that explains a process flow (#1) until an image forming apparatus 2 performs substitution printing when a trouble occurs in the image forming apparatus 1 in the image forming system 100; and FIG. 4 shows a sequence chart that explains a process flow (#2) until an image forming apparatus 2 performs substitution printing when a trouble occurs in the image forming apparatus 1 in the image forming system 100.

DESCRIPTION OF EMBODIMENTS

Hereinafter, an embodiment of the present invention will be explained with referencing drawings. The following explanation firstly explains a whole configuration of an image forming system according to the present embodiment. Subsequently, a configuration of an image forming apparatus is explained in detail. Finally, explained is a process flow from when a trouble occurs in an image forming apparatus until substation printing is performed by another image forming apparatus.

[Configuration of the Whole System]

Figure 1:
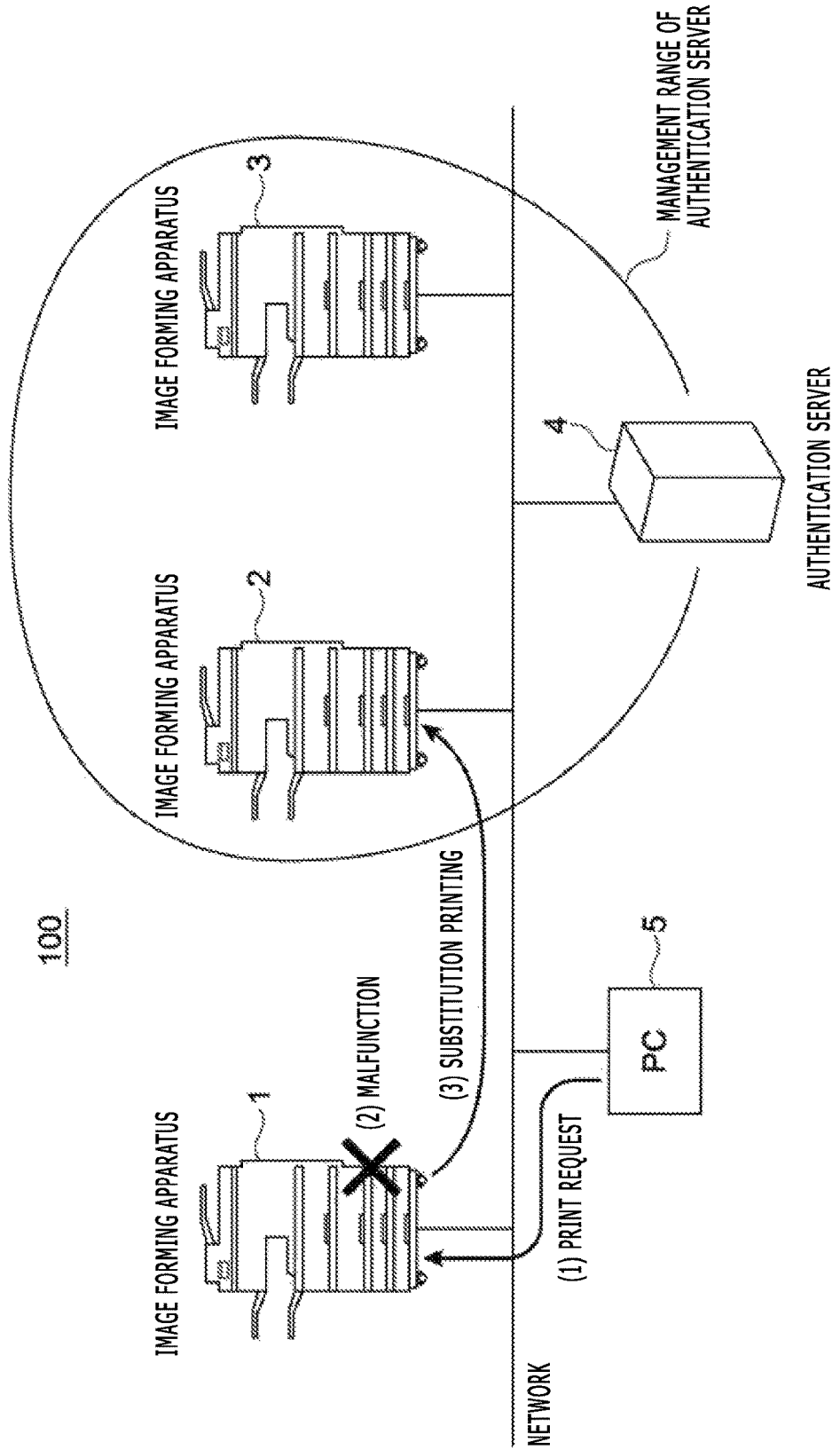
FIG. 1 shows a configuration diagram that indicates an example of a whole configuration of an image forming system 100 according to the present embodiment.

Firstly, explained as an example is a whole configuration of an image forming system according to the present embodiment. FIG. 1 shows a configuration diagram that indicates an example of a whole configuration of an image forming system 100 according to the present embodiment.

In this example, the image forming apparatus 100 includes an image forming apparatus 1, an image forming apparatus 2, an image forming apparatus 3, and an authentication server 4. A PC (Personal Computer) 5 is used to provide a print instruction to an image forming apparatus (here the image forming apparatus 1 in this example). The image forming apparatuses 1 to 3 may be configured with a same configuration except for detailed control, and therefore the detailed configuration is explained of only the image forming apparatus 1.

The authentication server 4 may be configured as an ordinary computer, and therefore the configuration thereof is not explained here. The PC 5 is also not explained as well. It should be noted that the authentication server 4 may be configured as one independent server as mentioned or configured to built in the image forming apparatus.

In this example, an authentication server for the image forming apparatus 1 is built in the image forming apparatus 1 itself, and the image forming apparatus 1 adopts an authentication mode that performs user authentication based on authentication information maintained inside, and the image forming apparatuses 2 and 3 adopt an authentication mode that performs user authentication based on authentication information maintained in the independent authentication server 4.

In this example, the PC 5 makes a print request to the image forming apparatus 1, but a trouble (malfunction)

occurs in the image forming apparatus 1 and therefore it is determined that the image forming apparatus 2 is selected to perform substitution printing, and the image forming apparatus 1 makes a substitution printing request to the image forming apparatus 2.

In this example, an image forming apparatus managed by the authentication server 4 that performs user authentication includes only the image forming apparatuses 2 and 3, and does not include the image forming apparatus 1. When a user who transmits a print request to the image forming apparatus 1 is not registered in the authentication server 4, in an ordinary method, even if the print instruction transmitted from the PC 5 to image forming apparatus 1 is forwarded to the image forming apparatus 2, the user can not use the image forming apparatus 2 for printing.

[Configuration of the Image Forming Apparatus 1]

Figure 2:
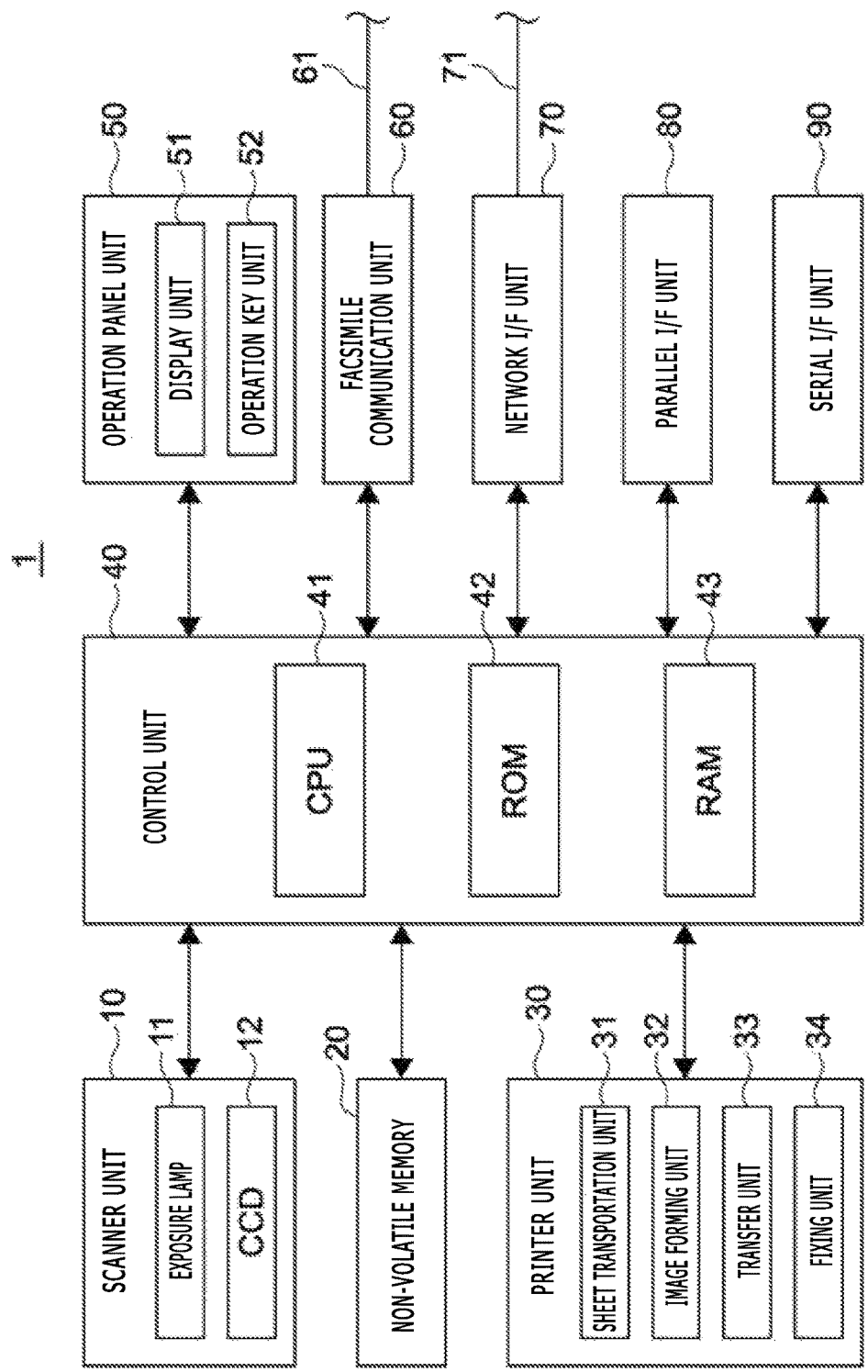
FIG. 2 shows a block diagram that indicates an example of a configuration of an image forming apparatus 1 according to the present embodiment.

Subsequently, the following part explains a configuration of the image forming apparatus 1 according to the present embodiment. FIG. 2 shows a block diagram that indicates an example of a configuration of the image forming apparatus 1 according to the present embodiment. The image forming apparatus shown in this figure is a so-called MFP (Multi-function Peripheral) that has plural functions related to image forming such as a copier function, a printer function, a facsimile function, and a scanner function.

The image forming apparatus 1 include a scanner unit 10, a non-volatile memory 20, a printer unit 30, a control unit 40, an operation panel unit 50, a facsimile communication unit 60, a network I/F unit 70, a parallel I/F unit 80, and a serial I/F unit 90.

Further, the scanner unit 10, the non-volatile memory 20, the control unit 40, the operation panel unit 50, and the network I/F unit 70 carry out a network scanner function that encrypts image data of an image obtained by image scanning and transmits the encrypted image data as an email to a preset email address, and directly transmits the encrypted image data to a preset IP address.

Furthermore, the scanner unit 10, the non-volatile memory 20, the printer unit 30, the control unit 40, the operation panel unit 50, and the facsimile communication unit 60 carry out the facsimile function. Furthermore, the non-volatile memory 20, the printer unit 30, the control unit 40, the operation panel unit 50, the network I/F unit 70, and the parallel I/F unit 80 carry out the printer function. Furthermore, the scanner unit 10, the non-volatile memory 20, the printer unit 30, the control unit 40, and the operation panel unit 50 carry out the copier function.

The operation panel unit 50 is used for a user operation on the copier function, the printer function, the facsimile function, the scanner function and the like, and provides an instruction by a user operation to the control unit 40, such as an image forming instruction for printing information stored in the non-volatile memory 20.

Further, the operation panel unit 50 receives inputting a password and/or a user ID (authentication ID) as user identification information, the password is for example a password that only a user allowed to access confidential information knows (i.e. a password as identification information to identify that a user who knows this password is a user allowed to access confidential information), and the user ID is identification information to individually identify each user.

The operation panel unit 50 includes a display unit 51 that includes a touch panel or the like, and an operation key unit 52 that includes a start key, numeric keys, and the like.

The display unit 51 includes a touch panel unit or the like as a combination of a touch panel and an LCD (Liquid Crystal Display) capable of displaying, and displays sorts of operation screens and enables an input operation.

For example, when performing the facsimile function, the display unit 51 displays information on user selection, destination selection, transmission setting and the like, and displays operation buttons or the like of which the part is touched by a user for inputting sorts of instructions.

The operation key unit 52 is used for inputting sorts of instructions such as a copy execution starting instruction or a facsimile transmission starting instruction by a user.

The scanner unit 10 optically obtains an image of a document and generates its image data. The scanner unit 10 includes an exposure lamp 11 and a CCD (Charge Coupled Device) 12. The scanner unit 10 irradiates light to a document using the exposure lamp 11 and receives its reflection light using the CCD 12, and thereby scans a document image and outputs image data corresponding to the scanned image to the control unit 40. The scanner unit 10 may be capable of scanning not only a monochrome document but a color document or a photograph document.

The non-volatile memory 20 is an example of a storage unit that stores, for example, image data of a document encrypted by the control unit 40. The non-volatile memory 20 may be a non-volatile semiconductor memory such as SSD (Solid State Drive) or an HDD (Hard Disk Drive).

The printer unit 30 obtains image data from the control unit 40 such as image data of a document scanned by the scanner unit 10, image data received via the network I/F unit 70 from an external personal computer or the like, facsimile data received via the facsimile communication unit 60 from an external facsimile device or the like, and prints an image based on the image data on a predetermined paper sheet.

The printer unit 30 is an electrographic-type image forming unit that, for example, includes a sheet transportation unit 31 that includes a paper cassette, a paper feeding roller and the like, an image forming unit 32 that includes an intermediate transfer member roller, a photoconductor drum, an exposure device, a development device and the like, a transfer unit 33 that includes a transfer roller and the like, and a fixing unit 34 that includes a fixing roller and the like.

Specifically, the sheet transportation unit 31 transports a paper sheet to the image forming unit 32, the image forming unit 32 forms a toner image corresponding to the aforementioned image data, the transfer unit 33 transfers the toner image on the paper sheet, and the fixing unit 34 forms an image by fixing the toner image on the paper sheet.

The printer unit 30 is not limited to an electrographic-type that forms an image using toner, and for example, as the printer unit 30, sorts of types can be used such as an ink-jet type that forms an image ejecting ink on a paper sheet or a thermal transfer type that transfers an image on a paper sheet heating an ink film.

The facsimile communication unit 60 includes an encoding/decoding unit (not shown), a modulation/demodulation unit (not shown), and an NCU (Network Control Unit, not shown), and transmits image data of a document scanned by the scanner unit 10 via a communication line 61 such as a telephone line, an Internet connection or the like to another facsimile device, and receives image data transmitted from another facsimile device.

The encoding/decoding unit compresses and encodes image data to be transmitted, and decompresses and decodes received image data. The modulation/demodulation unit modulates the compressed and encoded image data to an audio signal and demodulates a received signal (audio signal) to image data. Further, the NCU controls telephone line connection with a facsimile device as a transmission destination.

The network I/F unit 70 controls transmission and receipt of sorts of data with an external terminal such as personal computer (the PC 5 or the like) connected via a LAN (Local Area Network) 71 using a network interface (e.g. 10/100base-TX) or the like. For example, the network I/F unit 70 transmits document image data that is scanned by the scanner unit 10 and encrypted by the control unit 40 as an email to a terminal device, and receives image data transmitted from a terminal device for printing in the printer unit 30.

The parallel I/F unit 80 receives print data or the like from an external device through a parallel transmission that transmits data with plural bits using plural signal lines, using a high-speed bidirectional parallel interface (e.g. IEEE1284 compatible) or the like.

The serial I/F unit 90 receives sort of data or the like from an external device through a serial transmission that transmits data with one bit using a single signal line, using a serial interface (e.g. RS-232C) or the like.

The control unit 40 includes a CPU (Central Processing Unit) 41, a ROM (Read Only Memory) 42 that stores a predetermined control program, a RAM (Random Access Memory) 43 (i.e. volatile memory) that temporary maintains data, and the like. Using these components, the control unit 40 controls the whole of the image forming apparatus 1 on the basis of instruction information received by the operation panel unit 50 or the like or a detection signal from sensors arranged at some positions in the image forming apparatus 1.

More specifically, the CPU 41 executes a control program stored in the ROM 42 and thereby the control unit 40 acts as a scanner controller (not shown), a facsimile controller (not shown), a printer controller (not shown), a copier controller (not shown), and a non-volatile memory controller (not shown).

A program executed by a computer as the control unit 40 to carry out the aforementioned functions may be stored in a non-volatile external storage device such as the non-volatile memory 20 and transferred to a main memory device such as the RAM 43, and thereby enabled to be executed by the CPU 41.

The scanner controller controls an action of each component used for carrying out the scanner function.

The facsimile controller controls an action of each component used for carrying out the facsimile function. When performing facsimile transmission, the facsimile controller directly transmits image data of a document scanned by the scanner unit 10 via the communication line 61 to a facsimile device or the like specified by a telephone number stored in the non-volatile memory 20 using the facsimile communication unit 60.

The printer controller controls an action of each component used for carrying out the printer function.

The copier controller controls an action of each component used for carrying out the copier function.

The non-volatile memory controller performs initialization and partition generation of the non-volatile memory 20, and I/O control such as data read and data write.

[Degree of an Expected Trouble]

Here explained is a degree of an expected trouble that occurs in the image forming apparatus 1 in the present embodiment. A trouble of the image forming apparatus 1 expected in the present embodiment is a trouble that a function requested by a user can not be carried out but the control unit 40 can find out a substitution image forming apparatus and can request the found image forming apparatus to perform substitution of the function requested by the user.

Specifically, for example, as such trouble, there is a case that a user requests printing but the printing can not be performed due to toner empty or paper sheet jamming in the printer unit 30 or a trouble of the printer unit 30 or the printer controller. Otherwise, if a user requests facsimile transmission, for example, as such trouble, there is a case that the facsimile transmission can not be performed due to a trouble on a telephone line or a trouble of the facsimile communication unit 60 or the facsimile controller.

[Flow of a Substitution Printing Process (#1)]

Subsequently, the following part explains a process flow (#1) until an image forming apparatus 2 performs substitution printing when a trouble occurs in the image forming apparatus 1 in the image forming system 100. It should be noted that one flow (#1) is explained here, and another one (#2) is mentioned below. A difference between these flows is selecting an image forming apparatus as substitution, namely the selection made by a user or by the control unit 40 of the image forming apparatus 1.

FIG. 3 shows a sequence chart that explains a process flow (#1) until an image forming apparatus 2 performs substitution printing when a trouble occurs in the image forming apparatus 1 in the image forming system 100.

(1) Firstly a user provides a print instruction to the image forming apparatus 1 directly or from the PC 5.

(2) The image forming apparatus 1 tries to perform printing based on the print instruction from the user but can not perform the printing due to occurrence of a trouble. Therefore, the control unit 40 of the image forming apparatus 1 starts to search an image forming apparatus available to perform substitution printing.

Specifically, the control unit 40 of the image forming apparatus 1 may broadcast a search message for a substitution printing device via a network, and the search message includes a summary of the print instruction and a summary of a required printing condition. A detailed search condition is mentioned below.

(3) Subsequently, among other image forming apparatuses that receive the aforementioned search message, an image forming apparatus available to perform a substitution printing process makes a response to the search message. This response can include information on system setting of this image forming apparatus that makes the response. The system setting is information that indicates a size of a paper sheet stored for printing, availability of color printing, availability of a finisher function, an authentication mode of user authentication and the like.

(4) When the image forming apparatus 1 receives a response message from an image forming apparatus (not limited to one apparatus) on the network, the control unit 40 of the image forming apparatus 1 makes a candidate list of image forming apparatuses available as a substitution (available for substitution), and shows the list to the user.

(5) The user operates the operation panel unit 50 and thereby selects an image forming apparatus to be actually requested to be a substitution from the shown substitution candidate list.

(6) Subsequently, the control unit 40 of the image forming apparatus 1 transmits a substitution printing request message to the selected image forming apparatus. Here the image forming apparatus 2 is selected.

(7) The control unit 40 of the image forming apparatus 2 receives the substitution printing request message, and subsequently, checks an authentication mode of user authentication in this image forming apparatus 2 and determines whether the user who issued the print instruction is registered in this authentication server 4 that manages the image forming apparatus 2.

If this user is not registered in the authentication server 4 and at now it is not allowed to process the substitution printing request received from the image forming apparatus 1, then the controller 40 of the image forming apparatus 2 transmits a message to request the authentication server 4 to issue a temporary authentication ID.

(8) The control unit of the authentication server 4 receives the issuing request message of a temporary authentication ID, and subsequently issues a temporary authentication ID for the image forming apparatus 2. It should be noted that here "temporary" means that a user who uses this authentication ID is not registered in the authentication server 4.

(9) The control unit 40 of the image forming apparatus 2 receives the issued temporary authentication ID from the authentication server 4, and subsequently includes the issued temporary authentication ID in a response message to the substitution printing request received in the aforementioned (6) and transmits the response message to the image forming apparatus 1. Here, sent back as the response message is a message that indicates accepting the substitution printing request.

(10) When receiving the message that indicates accepting the request from the image forming apparatus 2, the control unit 40 of the image forming apparatus 1 forwards the print data for printing based on the print instruction to the image forming apparatus 2.

(11) In addition, when receiving the message that indicates accepting the request from the image forming apparatus 2, the control unit 40 of the image forming apparatus 1 notifies the user of the authentication ID included in this message. The notification of the authentication ID may be displaying the authentication ID on the display unit 51 of the image forming apparatus 1 or displaying the authentication ID on a screen in the PC 5 that the user inputted the print instruction.

(12) The user inputs the authentication ID informed from the image forming apparatus 1 to the image forming apparatus 2 and selects print data for printing.

For example, the user makes a note of the authentication ID displayed on the operation panel unit 50 of the image forming apparatus 1, moves to the image forming apparatus 2 with the note, and inputs the authentication ID on the note using the operation panel unit 50 of the image forming apparatus 2. Further, for example, when the authentication ID is displayed on a screen in the PC 5 where the user inputted the print instruction, the user may input the authentication ID as well in an authentication ID input screen displayed on the PC 5 for inputting the authentication ID informed from the image forming apparatus 2.

(13) If the authentication ID issued from the authentication server 4 in the aforementioned (8) is identical to the authentication ID inputted by the user, then the image forming apparatus 2 performs the printing with a printing condition specified by the print data forwarded in the aforementioned (10).

This part has explained a process flow (#1) until an image forming apparatus 2 performs substitution printing when a trouble occurs in the image forming apparatus 1 in the image forming system 100.

[Search Condition]

Here the aforementioned search condition is explained in detail.

The search condition means a condition used by the control unit 40 of the image forming apparatus 1 in which a trouble occurs when searching for an image forming apparatus for substitution printing, and an image forming apparatus that satisfies this condition falls into a candidate of an substitution image forming apparatus.

The search condition, for example, includes having a paper sheet of a size and a type that would be used in the image forming apparatus 1 in which a trouble occurs; using the same authentication mode, namely managed by the same authentication server; being the same machine type; or the like. The determination of the same machine type may be performed as transmitting a specific packet, receiving a response, and determining the same machine type on the basis of the response.

Further, the search condition includes, for example, an identical printing environment such as printing density.

These conditions are included in the print data, and therefore when forwarding the print data, these condition are also forwarded and the image forming apparatus as a forwarding destination and a substation performs printing with the same conditions.

[Flow of a Substitution Printing Process (#2)]

Subsequently, the following part explains a process flow (#2) until an image forming apparatus 2 performs substitution printing when a trouble occurs in the image forming apparatus 1 in the image forming system 100.

FIG. 4 shows a sequence chart that explains a process flow (#2) until an image forming apparatus 2 performs substitution printing when a trouble occurs in the image forming apparatus 1 in the image forming system 100.

As mentioned, the difference between the process flow (#1) and the process flow (#2) is the selection of the image forming apparatus as a substitution: one is performed by a user and the other is performed by the control unit 40 of the image forming apparatus 1, and therefore, here only this portion is explained.

The different portion from the aforementioned process flow (#1) is the aforementioned (4) and (5). These processes are replaced with the following (4').

(4') When the image forming apparatus 1 receives a response message from an image forming apparatus (not limited to one apparatus) on the network, the control unit 40 of the image forming apparatus 1 makes a candidate list of image forming apparatuses available as a substitution (available for substitution), selects an image forming apparatus to be actually requested to be a substitution, and notifies the control unit 40 of the image forming apparatus 1 itself of the selection result.

It should be noted that for example, for selecting one image forming apparatus among plural image forming apparatuses included in the candidate list, using the aforementioned search condition, an image forming apparatus that satisfies most search conditions may be selected. In this manner, the image forming apparatus as a substitution is selected without user's bothersome.

This part has explained a process flow (#2) until an image forming apparatus 2 performs substitution printing when a trouble occurs in the image forming apparatus 1 in the image forming system 100.

It should be noted that the aforementioned description has been presented for purposes of illustration and description, and is not intended to be exhaustive nor to limit the present invention.

Further, it should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

The invention claimed is:

1. An image forming system, comprising:
   a first image forming apparatus;
   at least one second image forming apparatus; and
   an authentication server that performs user authentication of the at least one second image forming apparatus;
   wherein the first image forming apparatus, the second image forming apparatus and the authentication server are capable of connecting to each other using a network;
   the first image forming apparatus comprises a first control unit configured to (a1) make a substitution printing request to the second image forming apparatus available to perform printing based on a print instruction from a user and (a2) receive an authentication ID from the requested second image forming apparatus if the user is not managed by the authentication server that manages the requested second image forming apparatus and notify the user of the received authentication ID, when the first image forming apparatus cannot perform the printing based on the print instruction, the authentication ID issued for temporary authentication of the user;
   the second image forming apparatus comprises a second control unit configured to (b1) request the authentication server to issue the authentication ID, (b2) receive the issued authentication ID and notify the first image forming apparatus of the received authentication ID, and (b3) receive inputting the authentication ID from the user and perform printing based on the print instruction if the inputted authentication ID is identical to the received authentication ID; if the authentication server cannot authenticate the user who is not managed by the authentication server when the second image forming apparatus receives the substitution printing request from the first image forming apparatus;
   the authentication server is configured to issue the authentication ID when receiving a request to issue the authentication ID from the second image forming apparatus; and
   wherein the first control unit of the first image forming apparatus searches for the second image forming apparatus available to perform printing based on the print instruction before making the substitution printing request, and selects the second image forming apparatus to be requested on the basis of the search result; said search being based on the paper type used in the second forming apparatus.

2. An image forming apparatus, comprising
   a control unit configured to (a1) make a substitution printing request to another image forming apparatus connected via a network and available to perform printing based on a print instruction from a user and (a2) receive an authentication ID from the requested another image forming apparatus if the user is not managed by the authentication server that manages the requested another image forming apparatus and notify the user of the received authentication ID, when this image forming apparatus cannot perform the printing based on the print instruction;
   wherein the authentication ID is issued for temporary authentication of the user and the another image forming apparatus will print the printing request based on the authentication ID; and the control unit searches for an image forming apparatus available to perform printing based on the print instruction before making the substitution printing request, and selects the another image forming apparatus to be requested on the basis of the search result; said search being based on the printing environment used in the another forming apparatus.

3. An image forming apparatus, comprising
   a control unit configured to receive via a network a substitution printing request from another image forming apparatus that cannot perform printing based on a print instruction from a user; and if an authentication server cannot authenticate the user who is not managed by the authentication server, (a) request the authentication server to issue an authentication ID, (b) receive the issued authentication ID and notify the another image forming apparatus of the received authentication ID, and (c) receive inputting the authentication ID from the user and perform printing based on the print instruction if the inputted authentication ID is identical to the received authentication ID;
   wherein the authentication ID is issued for temporary authentication of the user.

4. An authentication server, comprising
   a control unit configured to receive a request to issue an authentication ID via a network from an image forming apparatus managed by this authentication server and issue the authentication ID; said request issued if said authentications server does not manage a user;
   wherein the authentication ID is issued for temporary authentication of said user who is not managed by this authentication server and the image forming apparatus will print a print job for the user based on the issued authentication ID.

* * * * *